(12) United States Patent
Yune et al.

(10) Patent No.: US 8,005,031 B2
(45) Date of Patent: Aug. 23, 2011

(54) APPARATUS AND METHOD FOR TRANSMITTING AND RECEIVING A SIGNAL IN A WIRELESS COMMUNICATION SYSTEM

(75) Inventors: Tae-Won Yune, Pohang-si (KR); Jong-Hyeuk Lee, Anyang-si (KR); Gi-Hong Im, Pohang-si (KR); Eung-Sun Kim, Suwon-si (KR); Jong-Hyung Kwun, Seoul (KR)

(73) Assignees: Samsung Electronics Co., Ltd. (KR); Postech Foundation (KR)

( * ) Notice: Subject to any disclaimer, the term of this patent is extended or adjusted under 35 U.S.C. 154(b) by 494 days.

(21) Appl. No.: 11/649,168

(22) Filed: Jan. 3, 2007

(65) Prior Publication Data

US 2007/0230383 A1 Oct. 4, 2007

(30) Foreign Application Priority Data

Dec. 30, 2005 (KR) .................. 10-2005-0135410

(51) Int. Cl.
*H04B 7/00* (2006.01)
(52) U.S. Cl. ......... 370/310; 370/204; 370/342; 370/334
(58) Field of Classification Search .............. 370/204, 370/342, 334, 310; 375/299, 130, 267, 259, 375/146, 265, 340
See application file for complete search history.

(56) References Cited

U.S. PATENT DOCUMENTS

| | | | |
|---|---|---|---|
| 6,795,424 B1 * | 9/2004 | Kapoor et al. | 370/343 |
| 6,798,791 B1 * | 9/2004 | Riazi et al. | 370/515 |
| 6,816,555 B2 * | 11/2004 | Sakoda | 375/260 |
| 2002/0165626 A1 | 11/2002 | Hammons, Jr. et al. | |
| 2003/0073464 A1 * | 4/2003 | Giannakis et al. | 455/562 |
| 2003/0125040 A1 * | 7/2003 | Walton et al. | 455/454 |
| 2007/0183515 A1 * | 8/2007 | Lim et al. | 375/260 |
| 2007/0183527 A1 * | 8/2007 | Jia et al. | 375/267 |
| 2008/0108310 A1 * | 5/2008 | Tong et al. | 455/69 |

FOREIGN PATENT DOCUMENTS

| | | |
|---|---|---|
| KR | 1020030038270 | 5/2003 |
| KR | 1020030038289 | 5/2003 |
| KR | 1020030062791 | 7/2003 |

OTHER PUBLICATIONS

Alamouti, Siavash, "A Simple Transmit Diversity Technique for Wireless Communication", IEEE Journal on Select Areas in Communications, vol. 16, No. 8, Oct. 1998.*

* cited by examiner

*Primary Examiner* — Kamran Afshar
*Assistant Examiner* — Shahriar Behnamian
(74) *Attorney, Agent, or Firm* — The Farrell Law Firm, P.C.

(57) ABSTRACT

A method and apparatus for transmitting and receiving a signal in a wireless communication system. The wireless communication system includes a transmitter with at least four transmit antennas and a receiver with at least one receive antenna. Space Frequency Block Coding (SFBC) processes are performed for input signals on a basis of two antenna pairs. Signal blocks whose number corresponds to the number of transmit antennas are output. A Space Time Block Coding (STBC) process is performed for the signal blocks generated according to the antenna pairs. Signals carried by single carriers are transmitted through the at least four transmit antennas mapped to the signal blocks.

5 Claims, 7 Drawing Sheets

APPARATUS AND METHOD FOR TRANSMITTING AND RECEIVING A SIGNAL IN A WIRELESS COMMUNICATION SYSTEM

PRIORITY

This application claims priority under 35 U.S.C. §119 to an application filed in the Korean Intellectual Property Office on Dec. 30, 2005 and assigned Serial No. 2005-135410, the contents of which are incorporated herein by reference.

BACKGROUND OF THE INVENTION

1. Field of the Invention

The present invention generally relates to a signal transmission and reception in a communication system, and more particularly to an apparatus and method for transmitting and receiving a signal in a Space Time Frequency Block Code (STFBC) scheme in a communication system based on a single carrier transmission.

2. Description of the Related Art

Recently, the transmit diversity technology has been proposed which can increase channel capacity and link reliability by spatially arranging multiple transmit antennas without increasing a bandwidth or transmission power. A Single Carrier-Frequency Domain Equalization (SC-FDE) scheme has been proposed which exploits Space Time Block Coding (STBC) for providing transmit diversity gain.

FIG. 1 illustrates a structure of the conventional STBC transmission sequence.

Referring to FIG. 1, STBC data is transmitted through two antennas 101 and 103. At this time, symbol blocks 110, 120, 130, and 140 are sequentially transmitted in a time domain. Cyclic Prefixes (CPs) 112, 122, 132, and 142, serving as guard intervals, are inserted between the symbol blocks 110, 120, 130, and 140. At this time, two symbol blocks, i.e., n-th blocks 110 and 130, to be transmitted through the two antennas 101 and 103, are to have the same channel state.

When the STBC scheme is applied to a single carrier transmission scheme, for example, an SC-FDE scheme, the same channel state is maintained between the symbol blocks in a slow fading environment, such that performance is guaranteed. There is a problem, however, in that the performance is not guaranteed in a fast fading environment.

Furthermore, a Space Frequency Block Coding (SFBC) scheme is more robust to the fading environment in comparison with the STBC scheme. However, because the SFBC scheme is a multi-carrier scheme for applying a block code to a neighbor subchannel or carrier, it cannot be directly applied to the single carrier transmission scheme, i.e., the SC-FDE scheme. Even though the SFBC scheme is applied to the single carrier transmission scheme, its performance is guaranteed in a frequency non-selective fading channel, but degrades in a frequency selective fading channel.

Thus, when channel characteristics of a communication system are fast fading channel and frequency selective fading channel, and specifically, when the STBC or SFBC scheme is applied to the single carrier transmission system, the overall system performance can be degraded in the channels with the above-described channel characteristics.

SUMMARY OF THE INVENTION

It is, therefore, an object of the present invention to provide an apparatus and method for transmitting and receiving a signal in a wireless communication system based on a Space Time Frequency Block Code (STFBC) scheme using a Single Carrier-Frequency Domain Equalization (SC-FDE) scheme based on a single carrier transmission.

It is another object of the present invention to provide an apparatus and method for transmitting and receiving a signal in a wireless communication system based on a Space Time Frequency Block Code (STFBC) scheme that can avoid performance degradation in a fast fading channel and a frequency selective fading channel.

In accordance with an aspect of the present invention, there is provided a method for transmitting a signal in a wireless communication system having a transmitter with at least four transmit antennas and a receiver with at least one receive antenna, the method including performing Space Frequency Block Coding (SFBC) processes for input signals on a basis of two antenna pairs and outputting signal blocks whose number corresponds to the number of transmit antennas; and performing a Space Time Block Coding (STBC) process for the signal blocks generated according to the antenna pairs, and transmitting signals carried by single carriers through the at least four transmit antennas mapped to the signal blocks.

In accordance with another aspect of the present invention, there is provided a method for receiving a signal in a wireless communication system having a transmitter with at least four transmit antennas and a receiver with at least one receive antenna, the method including receiving a signal through the at least one receive antenna; removing guard intervals from a first signal of the received signal and a second signal obtained by delaying the received signal by a regular time; performing serial to parallel conversion processes for the first and second signals from which the guard intervals have been removed and performing Fast Fourier Transform (FFT) processes for parallel signals; combining the signals for which the FFT processes have been performed; solving simultaneous equations to remove components other than original signals from the combined signals; performing a Frequency Domain Equalization (FDE) process for signals obtained by solving the simultaneous equations; demultiplexing the signals for which the FDE process has been performed and performing FFT processes for the demultiplexed signals; and multiplexing the signals for which the FFT processes have been performed and performing signal recovery.

In accordance with another aspect of the present invention, there is provided an apparatus for transmitting a signal in a wireless communication system having a transmitter with at least four transmit antennas and a receiver with at least one receive antenna, the apparatus including a symbol mapper for mapping an input bit stream to a symbol of a predetermined length; a Space Time Frequency Block Code (STFBC) encoder for performing Space Frequency Block Coding (SFBC) processes for input signals on a basis of two antenna pairs, outputting signal blocks whose number corresponds to the number of transmit antennas, and performing a Space Time Block Coding (STBC) process for the signal blocks generated according to the antenna pairs; and guard interval inserters for inserting guard intervals into output signals of the STFBC encoder and transmitting the signals into which the guard intervals have been inserted through the at least four transmit antennas.

In accordance with yet another aspect of the present invention, there is provided an apparatus for receiving a signal in a wireless communication system having a transmitter with at least four transmit antennas and a receiver with at least one receive antenna, the apparatus including a delay unit for generating a second signal by delaying a signal received through the at least one receive antenna by a regular time; guard interval removers for removing guard intervals from a first signal received through the at least one receive antenna and the second signal; serial to parallel converters for performing serial to parallel conversion processes for the signals from which the guard intervals have been removed; first Fast Fourier Transform (FFT) processors for performing FFT processes for parallel signals; a linear combiner for combining the signals for which the FFT processes have been performed; a simultaneous equation solver for solving simultaneous equations to remove components other than original signals from the combined signals; a Single Carrier-Frequency Domain Equalization (SC-FDE) processor for performing an FDE process for signals obtained by solving the simultaneous equations; demultiplexers for demultiplexing the signals for which the FDE process has been performed; second FFT processors for performing FFT processes for the demultiplexed signals; and a multiplexer for multiplexing the signals for which the FFT processes have been performed and performing signal recovery.

BRIEF DESCRIPTION OF THE DRAWINGS

The above and other objects and aspects of the present invention will be more clearly understood from the following detailed description taken in conjunction with the accompanying drawings, in which.

DETAILED DESCRIPTION OF THE PREFERRED EMBODIMENTS

Embodiments of the present invention will be described in detail herein below with reference to the accompanying drawings. In the following description, detailed descriptions of functions and configurations incorporated herein that are well known to those skilled in the art are omitted for clarity and conciseness.

The present invention generally relates to a signal transmission and reception in a communication system, and more particularly to a signal transmission and reception in a Space Time Frequency Block Code (STFBC) scheme. The present invention provides the STFBC scheme using both a Space Time Block Coding (STBC) scheme and a Space Frequency Block Coding (SFBC) scheme in a communication system based on a single carrier transmission. The STFBC scheme has advantages of both the STBC and SFBC schemes.

Figure 1:
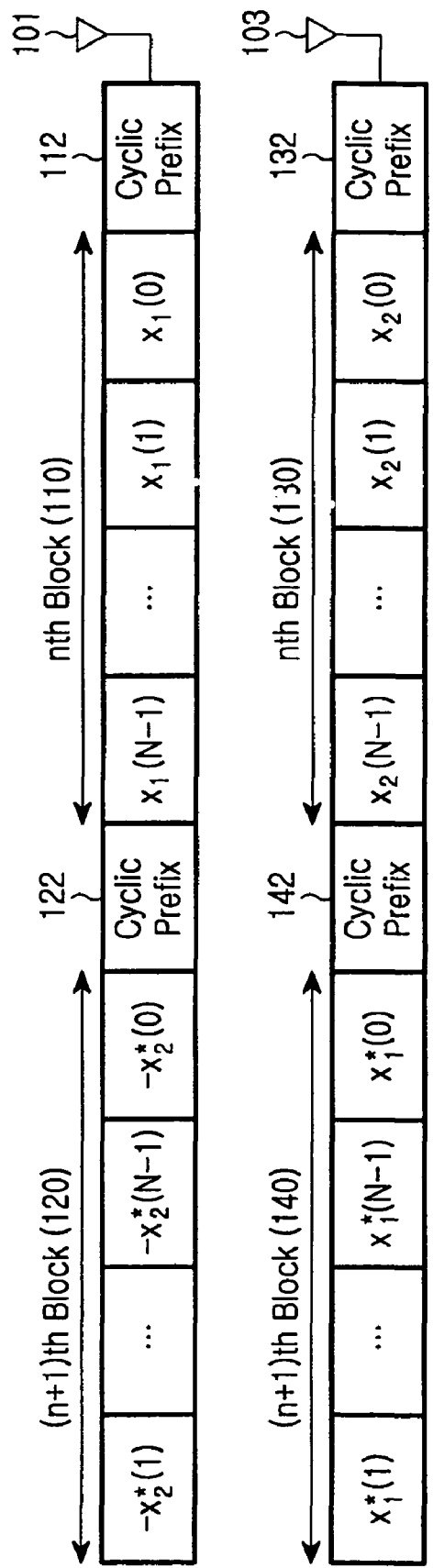
FIG. 1 illustrates a structure of a conventional Space Time Block Coding (STBC) transmission sequence.
Figure 2:
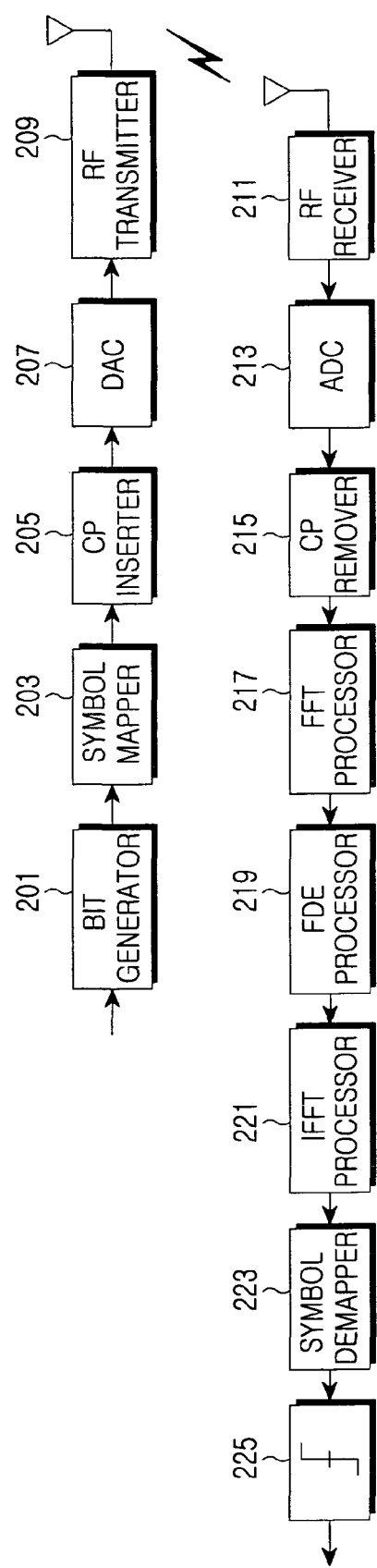
FIG. 2 illustrates a structure of a transceiver based on Single Carrier-Frequency Domain Equalization (SC-FDE) with a single transmit antenna.

FIG. 2 illustrates a structure of a transceiver based on Single Carrier-Frequency Domain Equalization (SC-FDE) with a single transmit antenna. The transmitter includes a bit generator 201, a symbol mapper 203, a Cyclic Prefix (CP) inserter 205, a Digital to Analog Converter (DAC) 207, and a Radio Frequency (RF) transmitter 209.

Also, a receiver includes an RF receiver 211, an Analog to Digital Converter (ADC) 213, a CP remover 215, a Fast Fourier Transform (FFT) processor 217, a Frequency Domain Equalization (FDE) processor 219, an Inverse Fast Fourier Transform (IFFT) processor 221, a symbol demapper 223, and a signal decider 225.

Referring to the operation of the transmitter, the bit generator 201 generates information bits and outputs the generated information bits to the symbol mapper 203. The symbol mapper 203 maps a bit stream output from the bit generator 201 to a symbol of a regular length, and outputs the symbol to the CP inserter 205.

The CP inserter 205 inserts a predetermined guard interval, i.e., a CP, into the symbol output from the symbol mapper 203, and outputs the symbol into which the CP has been inserted to the DAC 207. The DAC 207 converts a digital signal output from the CP inserter 205 to an analog signal and outputs the analog signal to the RF transmitter 209. The RF transmitter 209 transmits the analog signal carried by the radio frequency through an antenna.

Referring to the operation of the receiver, the RF receiver 211 receives a signal through an antenna and outputs the received signal to the ADC 213. The ADC 213 converts the analog signal output from the RF receiver 211 to a digital signal and outputs the digital signal to the CP remover 215. The CP remover 215 removes a CP from the digital signal of the ADC 213 and outputs the digital signal from which the CP has been removed to the FFT processor 217.

The FFT processor 217 performs an FFT process on the output signal of the CP remover 215. The FDE processor 219 performs an FDE process on an output signal of the FFT processor 217. The IFFT processor 221 performs an IFFT process on an FDE signal of the FDE processor 219 and outputs an IFFT signal to the symbol demapper 223.

The symbol demapper 223 demaps a bit stream from a symbol of the output signal of the IFFT processor 221 and outputs the bit stream to the signal decider 225. The signal decider 225 decides a transmitted signal from the bit stream of the symbol demapper 223.

The transceiver structure of the communication system based on the SC-FDE scheme has been described with reference to FIG. 2. A single carrier transmission sequence is designed and used to directly apply the SFBC of an existing Orthogonal Frequency Division Multiplexing (OFDM) scheme to the communication system using a single carrier. For this, the proposed SFBC scheme will be described with reference to FIG. 3, which illustrates a structure of a transceiver in a communication system using the SFBC.

Figure 3:
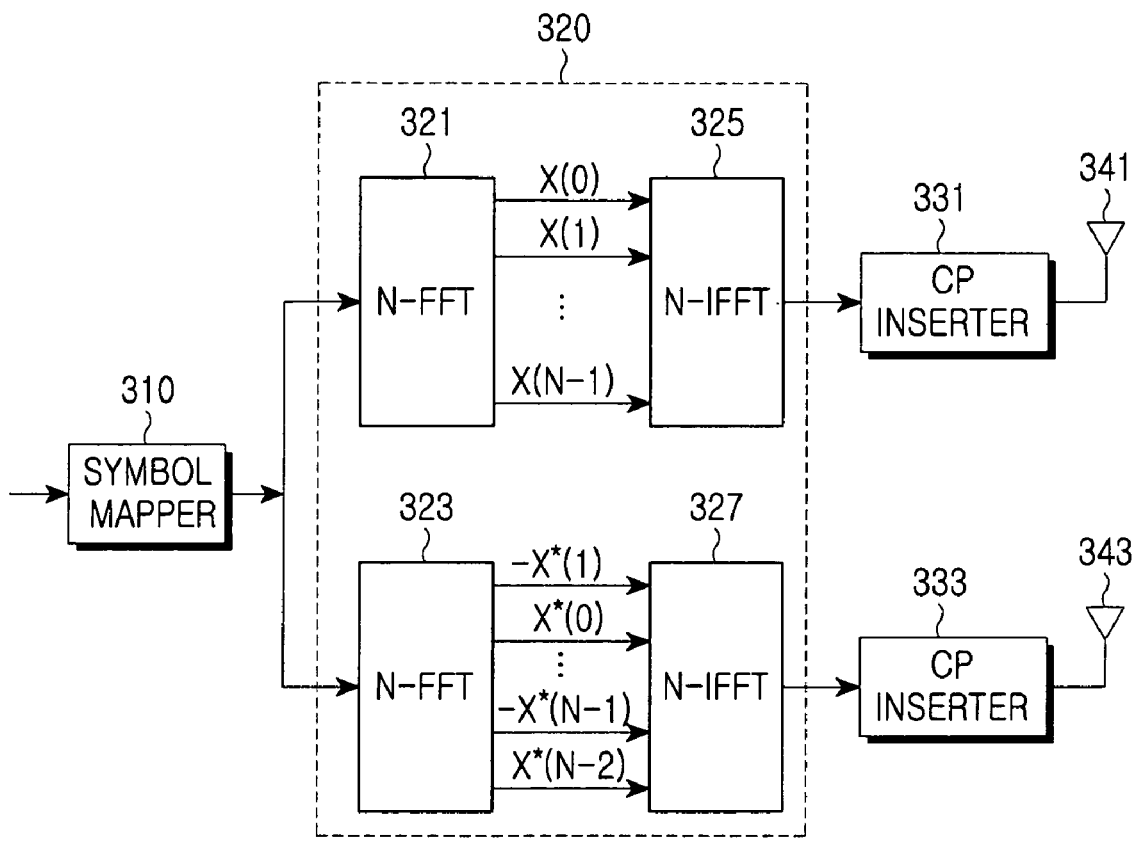
FIG. 3 is a diagram illustrating a virtual structure of a transceiver in a communication system using Space Frequency Block Coding (SFBC)

Referring to FIG. 3, for example, a transmitter with two antennas includes a symbol mapper 310, a virtual signal processor 320, CP inserters 331 and 333, and antennas 341 and 343.

The symbol mapper 310 maps a bit stream input from the bit generator 201 to a symbol of a regular length, and outputs the mapped bit stream to the virtual signal processor 320. Herein, the virtual signal processor 320 includes FFT processors 321 and 323 for performing N-point FFT processes and IFFT processors 325 and 327 for performing N-point IFFT processes.

The virtual signal processor 320 outputs two signal streams through one pair of the FFT processors 321 and 323 and the IFFT processors 325 and 327 mapped thereto. The CP inserters 331 and 333 insert CPs into the respective signal streams and transmit the signal streams into which the CPs have been inserted through the antennas 341 and 343. The virtual signal processor 320 conceptually shows a process for generating a time-domain single-carrier transmission signal to which the SFBC has been applied. The virtual signal processor 320 is not actually present in the structure of the transmitter of the present invention. When block codes for two transmit antennas and two neighbor frequency sub-channels after the FFT processors 321 and 323 are applied, time-domain transmission samples for the respective antennas can be easily generated and output through the IFFT processors 325 and 327. In relation to the symbol output from the symbol mapper 310, the time-domain transmission samples of the IFFT processors

325 and 327 are simply generated using symmetric characteristics of a Fourier transform as shown in Equation (1).

$$x(-n)_N \Leftrightarrow X(k), n,k=1,\ldots,N-1 \quad (1)$$

When the n-th symbol of a block to be transmitted from the i-th antenna is denoted by $x_i(n)$, the transmission symbol of the first antenna can be expressed as shown in Equation (2).

$$x_1(n) = \frac{1}{\sqrt{N}} \sum_{k=0}^{N-1} X_1(k) W_N^{-nk} \quad (2)$$

$$= \frac{1}{\sqrt{N}} \sum_{v=0}^{\frac{N}{2}-1} (X_1(2v) + W_N^{-n} X_1(2v+1)) W_{\frac{N}{2}}^{-nv}$$

$$= \frac{1}{\sqrt{2}} (x^e(n) + W_N^{-n} x^o(n)), n = 0, 1, \ldots, N-1$$

Herein, $x^e(n)$ and $x^o(n)$ can be expressed as shown in Equation (3).

$$x^e(n) = \sqrt{\frac{2}{N}} \sum_{v=0}^{\frac{N}{2}-1} X_1(2v) W_{\frac{N}{2}}^{-nv}, \quad (3)$$

$$x^o(n) = \sqrt{\frac{2}{N}} \sum_{v=0}^{\frac{N}{2}-1} X_1(2v+1) W_{\frac{N}{2}}^{-nv}$$

Because $x^e(n)$ and $x^o(n)$ have a period of N/2 with respect to n, they can be replaced with $$x^e\left((n)_{\frac{N}{2}}\right)$$

and $$x^o\left((n)_{\frac{N}{2}}\right).$$

Thus, scaling factors of the IFFT processors are adjusted in Equation (3) such that normal transmission power can be set to one. From Equations (1) and (2), the transmission symbol of the second antenna can be expressed as shown in Equation (4).

$$x_2(n) = \frac{1}{\sqrt{N}} \sum_{k=0}^{N-1} X_2(k) W_N^{-nk} \quad (4)$$

$$= \frac{1}{\sqrt{N}} \sum_{v=0}^{\frac{N}{2}-1} (-X_1^*(2v+1) + W_N^{-n} X_1^*(2v)) W_{\frac{N}{2}}^{-nv}$$

$$= \frac{1}{\sqrt{2}} \left[-x^{o*}\left((-n)_{\frac{N}{2}}\right) + W_N^{-n} x^{e*}\left((-n)_{\frac{N}{2}}\right)\right]$$

From the second and third lines of Equation (4), it can be seen that the SFBC has been applied.

Figure 4:
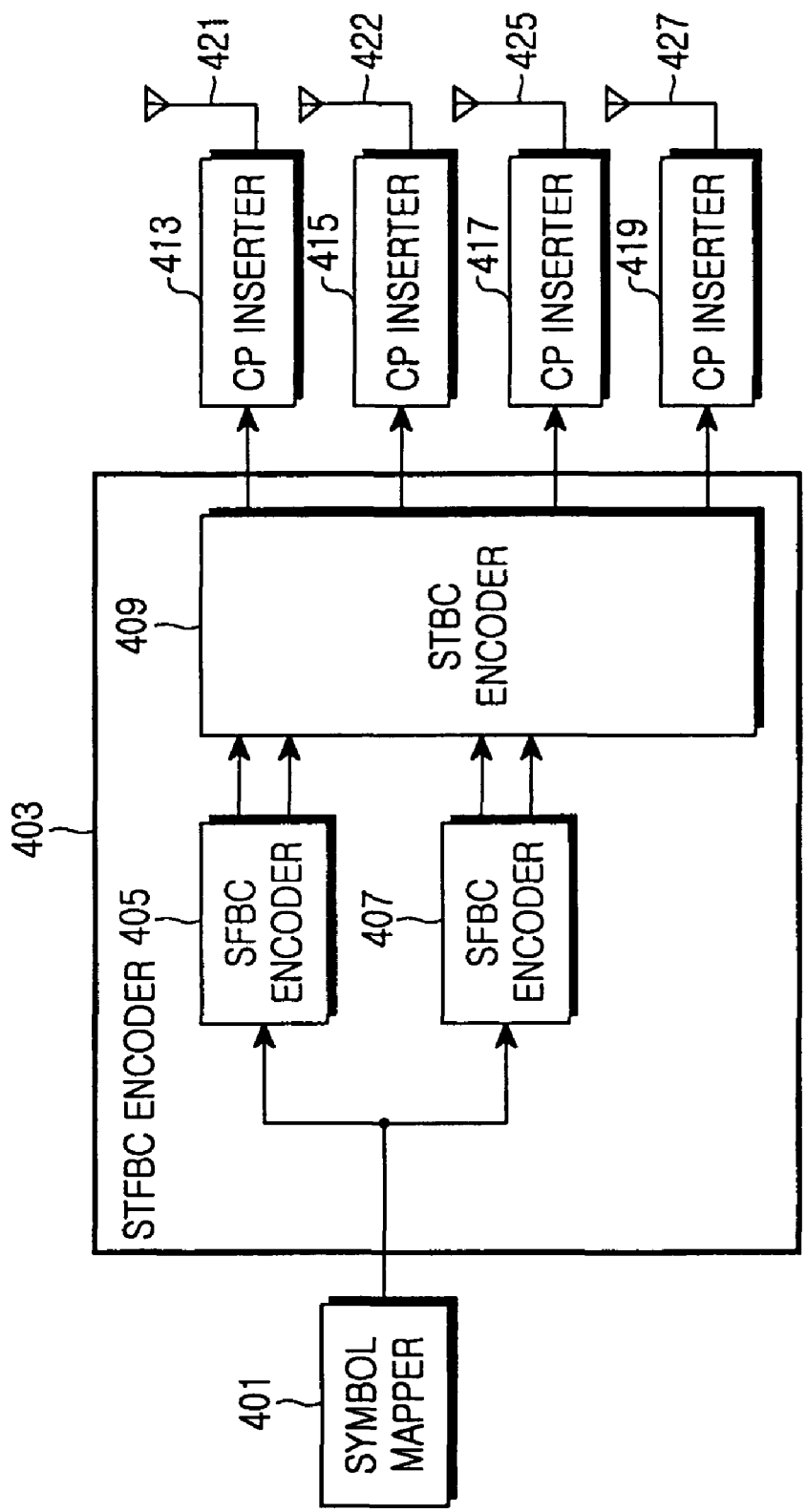
FIG. 4 illustrates a structure of a transmitter in a communication system using a Space Time Frequency Block Code (STFBC) scheme in accordance with the present invention.

FIG. 4 illustrates a structure of a transmitter in a communication system using the STFBC scheme in accordance with the present invention. The transmitter includes a symbol mapper 401, an STFBC encoder 403, CP inserters 413, 415, 417, and 419, and antennas 421, 423, 425, and 427.

The symbol mapper 401 maps a bit stream input from the bit generator 201 to a symbol of a regular length and outputs the symbol to the STFBC encoder 403. In this case, the STFBC encoder 403 includes SFBC encoders 405 and 407 and an STBC encoder 409. An example in which SFBC and STBC processes are performed for the symbol and the transmitter structure having four transmit antennas will be described with reference to FIG. 5. Signals of the STFBC encoder 403 to be transmitted through the respective antennas in the t-th time interval are defined in Equation (5).

$$x'_{a0}(n) = \frac{1}{\sqrt{N}} \sum_{k=0}^{N-1} X'_0(k) W_N^{-nk} \quad (5)$$

$$= \frac{1}{\sqrt{N}} \sum_{v=0}^{\frac{N}{2}-1} (X_0(2v) - W_N^{-n} X_2^*(2v)) W_{\frac{N}{2}}^{-nk}$$

$$= \frac{1}{\sqrt{2}} \left(x_0(n) - W_N^{-n} x_2^*\left((-n)_{\frac{N}{2}}\right)\right)$$

$$x'_{a1}(n) = \frac{1}{\sqrt{N}} \sum_{k=0}^{N-1} X'_1(k) W_N^{-nk}$$

$$= \frac{1}{\sqrt{N}} \sum_{v=0}^{\frac{N}{2}-1} (X_1(2v) - W_N^{-n} X_3^*(2v)) W_{\frac{N}{2}}^{-nk}$$

$$= \frac{1}{\sqrt{2}} \left(x_1(n) - W_N^{-n} x_3^*\left((-n)_{\frac{N}{2}}\right)\right)$$

$$x'_{a2}(n) = \frac{1}{\sqrt{N}} \sum_{k=0}^{N-1} X'_2(k) W_N^{-nk}$$

$$= \frac{1}{\sqrt{N}} \sum_{v=0}^{\frac{N}{2}-1} (X_2(2v) - W_N^{-n} X_0^*(2v)) W_{\frac{N}{2}}^{-nk}$$

$$= \frac{1}{\sqrt{2}} \left(x_2(n) - W_N^{-n} x_0^*\left((-n)_{\frac{N}{2}}\right)\right)$$

$$x'_{a3}(n) = \frac{1}{\sqrt{N}} \sum_{k=0}^{N-1} X'_3(k) W_N^{-nk}$$

$$= \frac{1}{\sqrt{N}} \sum_{v=0}^{\frac{N}{2}-1} (X_3(2v) - W_N^{-n} X_1^*(2v)) W_{\frac{N}{2}}^{-nk}$$

$$= \frac{1}{\sqrt{2}} \left(x_3(n) - W_N^{-n} x_0^*\left((-n)_{\frac{N}{2}}\right)\right)$$

$x'_{txi}(n)$ denotes the n-th symbol of a block to be transmitted from the i-th antenna in the t-th time interval. For blocks constructed by STFBC symbols, the first CP inserter 413 inserts a CP to transmit a block through the first antenna 421, the second CP inserter 415 inserts a CP to transmit a block through the second antenna 423, the third CP inserter 417 inserts a CP to transmit a block through the third antenna 425, and the fourth CP inserter 419 inserts a CP to transmit a block through the fourth antenna 427. Signals to be transmitted through the respective antennas in the next (t+T)-th time interval is defined in Equation (6).

$$x_{a0}^{t+T}(n) = \frac{1}{\sqrt{N}} \sum_{k=0}^{N-1} X_0^{t+T}(k) W_N^{-nk} \qquad (6)$$

$$= \frac{1}{\sqrt{N}} \sum_{v=0}^{\frac{N}{2}-1} (-X_1^*(2v) + W_N^{-n} X_3(2v)) W_{\frac{N}{2}}^{-nk}$$

$$= \frac{1}{\sqrt{2}} \left( -x_1^*((-n)_{\frac{N}{2}}) + W_N^{-n} x_3(n) \right)$$

$$x_{a1}^{t+T}(n) = \frac{1}{\sqrt{N}} \sum_{k=0}^{N-1} X_1^{t+T}(k) W_N^{-nk}$$

$$= \frac{1}{\sqrt{N}} \sum_{v=0}^{\frac{N}{2}-1} (X_0^*(2v) - W_N^{-n} X_2(2v)) W_{\frac{N}{2}}^{-nk}$$

$$= \frac{1}{\sqrt{2}} \left( x_0^*((-n)_{\frac{N}{2}}) + W_N^{-n} x_2(n) \right)$$

$$x_{a2}^{t+T}(n) = \frac{1}{\sqrt{N}} \sum_{k=0}^{N-1} X_2^{t+T}(k) W_N^{-nk}$$

$$= \frac{1}{\sqrt{N}} \sum_{v=0}^{\frac{N}{2}-1} (-X_3^*(2v) + W_N^{-n} X_1(2v)) W_{\frac{N}{2}}^{-nk}$$

$$= \frac{1}{\sqrt{2}} \left( -x_3^*((-n)_{\frac{N}{2}}) + W_N^{-n} x_1(n) \right)$$

$$x_{a3}^{t+N}(n) = \frac{1}{\sqrt{N}} \sum_{k=0}^{N-1} X_3^{t+T}(k) W_N^{-nk}$$

$$= \frac{1}{\sqrt{N}} \sum_{v=0}^{\frac{N}{2}-1} (X_2^*(2v) + W_N^{-n} X_0(2v)) W_{\frac{N}{2}}^{-nk}$$

$$= \frac{1}{\sqrt{2}} \left( x_2^*((-n)_{\frac{N}{2}}) + W_N^{-n} x_1(n) \right)$$

Equation (6) defines block symbols to be transmitted in the (t+T)-th time interval. The blocks as shown in FIG. 5 are transmitted through the CP inserters 413, 415, 417, and 419 and the antennas 421, 423, 425, and 427.

A sequence structure constructed by the blocks to be transmitted through the transmitter of FIG. 4 will be described with reference to FIG. 5.

Figure 5:
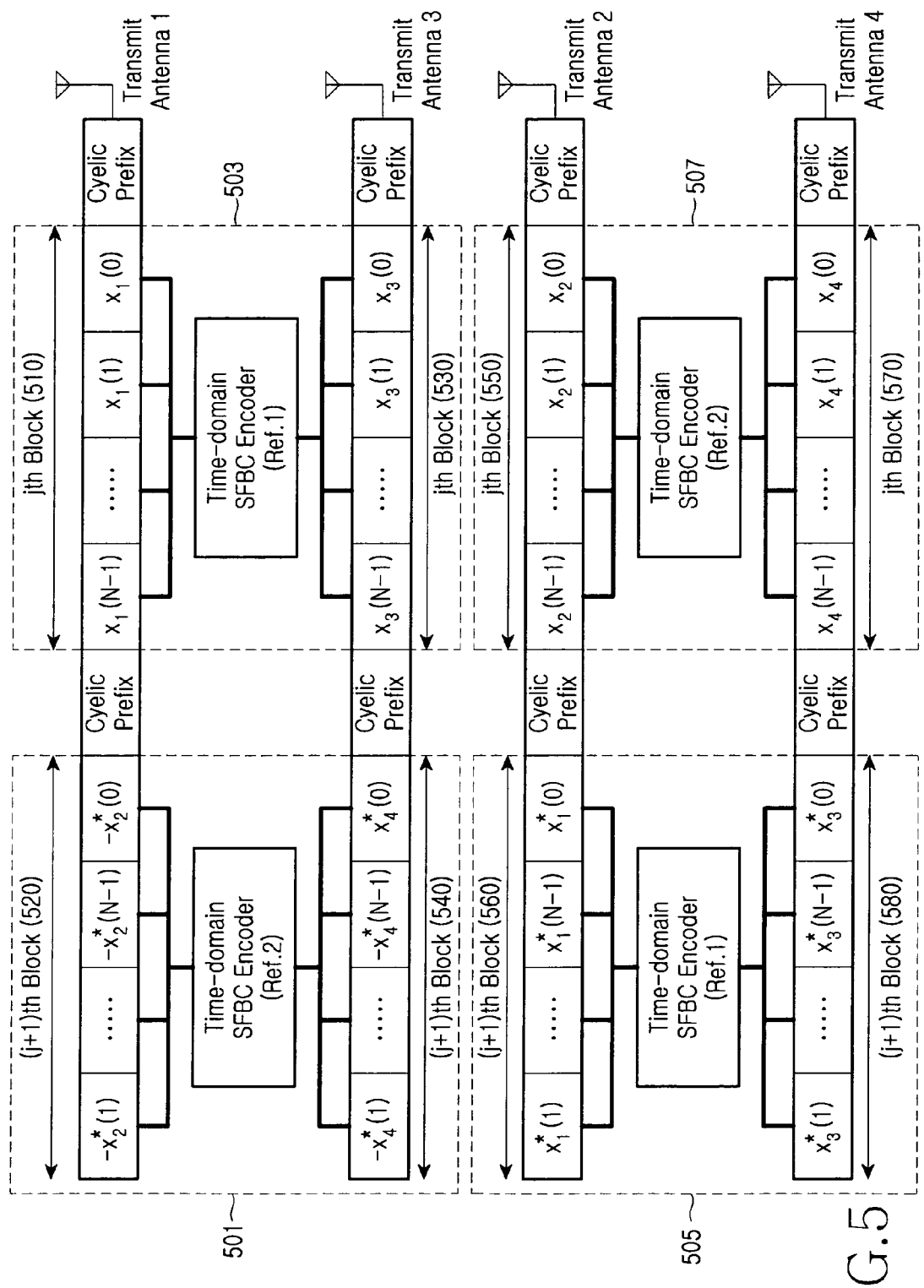
FIG. 5 illustrates a structure of an STFBC transmission sequence in accordance with the present invention.

FIG. 5 illustrates a structure of an STFBC transmission sequence in accordance with the present invention, where the 2j-th and (2j+1)-th blocks are transmitted through the i-th antenna. Symbols $x_i^{2j}(n)$ of the 2j-th block are defined in Equation (7).

$$x_1^{2j}(n) = \frac{1}{\sqrt{N}} \sum_{k=0}^{N-1} X_1^{2j}(k) W_N^{-nk} \qquad (7)$$

$$= \frac{1}{\sqrt{N}} \sum_{v=0}^{\frac{N}{2}-1} (X_1^{2j}(2v) - W_N^{-n} X_3^{2j*}(2v)) W_{\frac{N}{2}}^{-nv}$$

$$= \frac{1}{\sqrt{2}} \left[ x_{ref1}^e((n)_{\frac{N}{2}}) - W_N^{-n} x_{ref1}^{o*}((-n)_{\frac{N}{2}}) \right]$$

$$x_2^{2j}(n) = \frac{1}{\sqrt{N}} \sum_{k=0}^{N-1} X_2^{2j}(k) W_N^{-nk}$$

$$= \frac{1}{\sqrt{N}} \sum_{v=0}^{\frac{N}{2}-1} (X_2^{2j}(2v) - W_N^{-n} X_4^{2j*}(2v)) W_{\frac{N}{2}}^{-nv}$$

$$= \frac{1}{\sqrt{2}} \left[ x_{ref2}^e((n)_{\frac{N}{2}}) - W_N^{-n} x_{ref2}^{o*}((-n)_{\frac{N}{2}}) \right]$$

$$x_3^{2j}(n) = \frac{1}{\sqrt{N}} \sum_{k=0}^{N-1} X_3^{2j}(k) W_N^{-nk}$$

$$= \frac{1}{\sqrt{N}} \sum_{v=0}^{\frac{N}{2}-1} (X_3^{2j}(2v) + W_N^{-n} X_1^{2j*}(2v)) W_{\frac{N}{2}}^{-nv}$$

$$= \frac{1}{\sqrt{2}} \left[ x_{ref1}^o((n)_{\frac{N}{2}}) + W_N^{-n} x_{ref1}^{e*}((-n)_{\frac{N}{2}}) \right]$$

$$x_4^{2j}(n) = \frac{1}{\sqrt{N}} \sum_{k=0}^{N-1} X_4^{2j}(k) W_N^{-nk}$$

$$= \frac{1}{\sqrt{N}} \sum_{v=0}^{\frac{N}{2}-1} (X_4^{2j}(2v) + W_N^{-n} X_2^{2j*}(2v)) W_{\frac{N}{2}}^{-nv}$$

$$= \frac{1}{\sqrt{2}} \left[ x_{ref2}^o((n)_{\frac{N}{2}}) - W_N^{-n} x_{ref2}^{e*}((-n)_{\frac{N}{2}}) \right]$$

where $n = 0, 1, ..., N-1$

Symbols $x_i^{2j+1}(n)$ of the (2j+1)-th block are defined in Equation (8).

$$x_1^{2j+1}(n) = \frac{1}{\sqrt{2}} \left[ -x_{ref2}^{e*}((-n)_{\frac{N}{2}}) + W_N^{-n} x_{ref2}^o((n)_{\frac{N}{2}}) \right] \qquad (8)$$

$$x_2^{2j+1}(n) = \frac{1}{\sqrt{2}} \left[ -x_{ref1}^{e*}((-n)_{\frac{N}{2}}) - W_N^{-n} x_{ref1}^o((n)_{\frac{N}{2}}) \right]$$

$$x_3^{2j+1}(n) = \frac{1}{\sqrt{2}} \left[ -x_{ref2}^{o*}((-n)_{\frac{N}{2}}) - W_N^{-n} x_{ref2}^e((n)_{\frac{N}{2}}) \right]$$

$$x_4^{2j+1}(n) = \frac{1}{\sqrt{2}} \left[ -x_{ref1}^{o*}((-n)_{\frac{N}{2}}) + W_N^{-n} x_{ref1}^e((n)_{\frac{N}{2}}) \right]$$

The first block 510 corresponding to the j-th block is transmitted through the first antenna, the second block 530 corresponding to the j-th block is transmitted through the third antenna, the third block 550 corresponding to the j-th block is transmitted through the second antenna, and the fourth block 570 corresponding to the j-th block is transmitted through the fourth antenna.

Next, the fifth block 520 corresponding to the (j+1)-th block is transmitted through the first antenna, the sixth block 540 corresponding to the (j+1)-th block is transmitted through the third antenna, the seventh block 560 corresponding to the (j+1)-th block is transmitted through the second antenna, and the eighth block 580 corresponding to the (j+1)-th block is transmitted through the fourth antenna.

The STFBC encoder for generating signals is provided with two SFBC encoders. Through these encoders, an SFBC process is performed for blocks between the first and third antennas or the second and fourth antennas. Although two SFBC encoders are provided in the STFBC encoder illustrated in FIG. 4, the above-described operation can be performed in one SFBC encoder.

The SFBC processes are performed on the basis of antenna pairs, i.e., a pair of the first and third antennas and a pair of the second and fourth antennas, such that signals whose number corresponds to the number of transmit antennas are output. During the encoding process of the STBC encoder shown in FIG. 5, the STBC encoder performs the STBC process for generating signal blocks mapped to the respective antenna pairs, i.e., the first signal blocks mapped to the first and third antennas and the second signal blocks mapped to the second and fourth antennas.

The first signal blocks are the j-th blocks 510 and 530 and the (j+1)-th blocks 520 and 540 mapped to the first and third antennas. The second signal blocks are the j-th blocks 550 and 570 and the (j+1)-th blocks 560 and 580 mapped to the second and fourth antennas. The SFBC process is performed for the j-th blocks on the basis of a pair of two antennas (i.e., the pair of the first and third antennas or the second and fourth antennas), such that the signal blocks mapped to the respective antennas are generated.

Next, the STBC process is performed for the generated signal blocks, i.e., between the j-th and (j+1)-th blocks of the first and third antennas and the j-th and (j+1)-th blocks of the second and fourth antennas. As a result, the SFBC processes are performed between the antenna pairs and the STBC process is performed for the blocks of the antenna pairs for which the SFBC processes have been performed.

The above-described operations are the STFBC encoding process. The STFBC encoding process generates a sequence in which both the SFBC and STBC processes have been applied. The CPs are inserted between the blocks of the generated sequence. Thus, the STFBC blocks are transmitted through the antennas mapped to the respective blocks using single carriers.

As illustrated in FIG. 5, the four antennas are provided for the STFBC encoding process. When the transmitter structure is extended, a structure of more than four antennas can be exploited.

Figure 6:
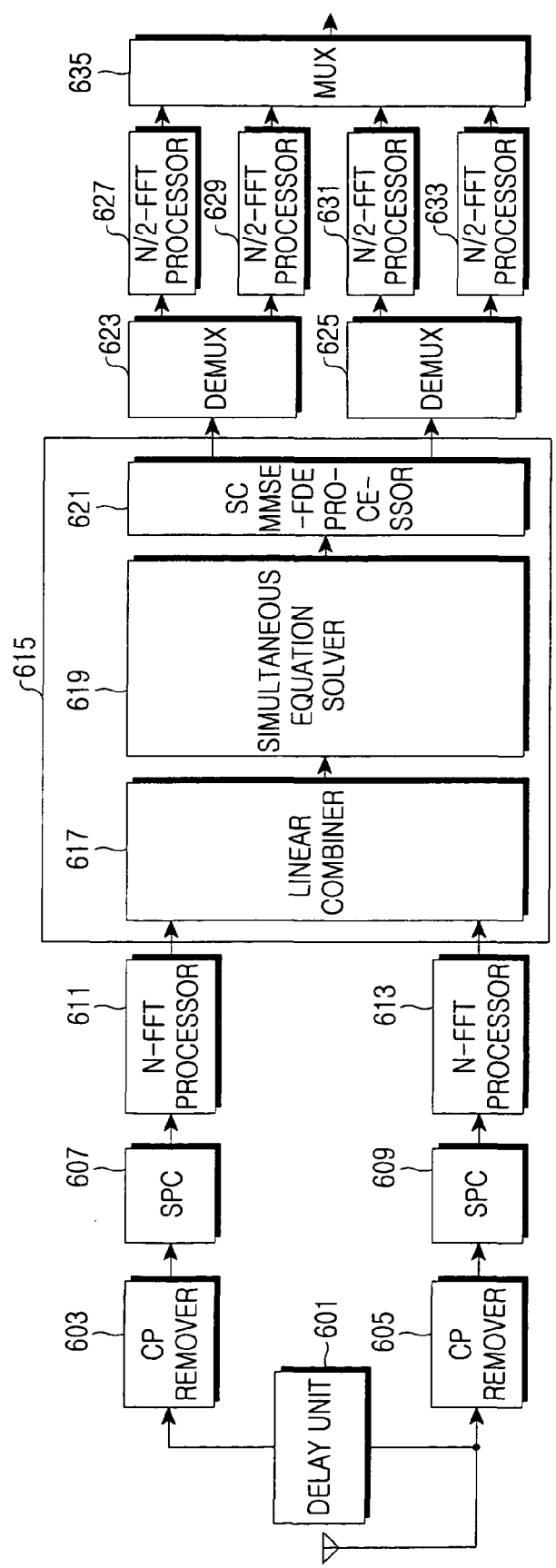
FIG. 6 illustrates a structure of a receiver in the communication system using the STFBC scheme in accordance with the present invention.

FIG. 6 illustrates a structure of a receiver in the communication system using the STFBC scheme in accordance with the present invention.

The receiver includes a delay unit 601, CP removers 603 and 605, Serial to Parallel Converters (SPCs) 607 and 609, N-FFT processors 611 and 613, a signal detector 615, demultiplexers (DEMUXs) 623 and 625, N/2-FFT processors 627, 629, 631, and 633, and a multiplexer (MUX) 635.

Signals of $x_i^{2j}$ and $x_i^{2j+1}$ transmitted from the transmitter based on the STFBC scheme are shown in Equation (9).

$$x_i^{2j} = [x_i^{2j}(0), x_i^{2j}(1), \ldots, x_i^{2j}(N-1)]^T$$

$$x_i^{2j+1} = [x_i^{2j+1}(0), x_i^{2j+1}(1), \ldots, x_i^{2j+1}(N-1)]^T \quad (9)$$

Herein, $i=1, \ldots, N_T$ and $j=0, \ldots, N_B/2-1$. The receiver receives the transmitted signals through an antenna. The delay unit 601 delays one of the received signals by a regular time. The delayed signal is input into the CP remover 603. The other signal is input into the CP remover 605. The CP removers 603 and 605 remove CPs from the signal received from the antenna and the signal output from the delay unit 601. The signals from which the CPs have been removed are output to the SPCs 607 and 609.

The signal output from the CP remover 603 is denoted by $r^{2j}$, and the signal output from the CP remover 605 is denoted by $r^{2j+1}$. $r^{2j}$ and $r^{2j+1}$ can be expressed by Equation (10).

$$r^{2j} = \sum_{i=1}^{N_T} H_i^{2j} x_i^{2j} + n^{2j}, \quad r^{2j+1} = \sum_{i=1}^{N_T} H_i^{2j+1} x_i^{2j+1} + n^{2j+1} \quad (10)$$

Herein, $H_i^{2j}$ and $H_i^{2j+1}$ are N×N cyclic channel matrices of $N_T$ transmit antennas, and $n^{2j}$ and $n^{2j+1}$ are Additive White Gaussian Noise (AWGN). The SPCs 607 and 609 convert the serial signals of $r^{2j}$ and $r^{2j+1}$ to parallel signals. The parallel signals are input to the FFT processors 611 and 613. N-point FFT processes are performed for the parallel signals. The FFT signals are input into the signal detector 615. In relation to the received vectors of $r^{2j}$ and $r^{2j+1}$, the signals to be output from the FFT processors 611 and 613 are converted to frequency domain signals using an N×N Discrete Fourier Transform (DFT) matrix W as shown in Equation (11).

$$R^{2j} = \sum_{i=1}^{N_T} W H_i^{2j} W^H X_i^{2j} + N^{2j}, \quad (11)$$

$$R^{2j+1} = \sum_{i=1}^{N_T} W H_i^{2j+1} W^H X_i^{2j+1} + N^{2j+1},$$

where $R^{2j} \underline{\Delta} W r^{2j}$, $R^{2j+1} \underline{\Delta} W r^{2j+1}$, $X_i^{2j} \underline{\Delta} W x_i^{2j}$, $X_i^{2j+1} \underline{\Delta} W x_i^{2j+1}$, $N_i^{2j} \underline{\Delta} W n^{2j}$, and $N^{2j+1} \underline{\Delta} W n^{2j+1}$.

$\Psi_i^{2j}$ and $\Psi_i^{2j+1}$, corresponding to N×N diagonal matrices with Fourier transform values of channel impulse responses are defined as shown in Equation (12).

$$\Psi_i^{2j} \underline{\Delta} W H_i^{2j} W^H, \Psi_i^{2j+1} \underline{\Delta} W H_i^{2j+1} W^H \quad (12)$$

The signal detector 615 for receiving the output signal $R^{2j}$ of the FFT processor 611 and the output signal $R^{2j+1}$ of the FFT processor 613 includes a linear combiner 617, a simultaneous equation solver 619, and a SC Minimum Mean Square Error-Frequency Domain Equalization (SC MMSE-FDE) processor 621.

The linear combiner 617 receives the frequency domain signals $R^{2j}$ and $R^{2j+1}$. $R^{2j}$ and $R^{2j+1}$ are expressed by Equation (13).

$$R_1 = \Lambda_1 X_1 + \Lambda_2 X_2 + \Lambda_3 X_3 + \Lambda_4 X_4 + N_1$$

$$R_2 = -\Lambda_1 X_2 + \Lambda_2 X_1 - \Lambda_3 X_4 + \Lambda_4 X_3 + N_2$$

$$R_3 = -\Lambda_1 X_3 - \Lambda_2 X_4 + \Lambda_3 X_1 + \Lambda_4 X_2 + N_3$$

$$R_4 = \Lambda_1 X_4 - \Lambda_2 X_3 - \Lambda_3 X_2 + \Lambda_4 X_1 + N_4 \quad (13)$$

Herein, $\Lambda_i$ is diagonal elements of $\Psi_i^{2j}$ and $\Psi_i^{2j+1}$, where i has a value between 1 and $N_T$. Thus, the linear combiner 617 combines the output signals of the FFT processors 611 and 613. For example, the signal combination is shown in Equation (14).

$$\tilde{X} = \begin{bmatrix} \tilde{X}_1 \\ \tilde{X}_2 \\ \tilde{X}_3 \\ \tilde{X}_4 \end{bmatrix} = \begin{bmatrix} \Theta & 0 & 0 & \Phi \\ 0 & \Theta & -\Phi & 0 \\ 0 & -\Phi & \Theta & 0 \\ \Phi & 0 & 0 & \Theta \end{bmatrix} \begin{bmatrix} X_1 \\ X_2 \\ X_3 \\ X_4 \end{bmatrix} + \begin{bmatrix} \tilde{N}_1 \\ \tilde{N}_2 \\ \tilde{N}_3 \\ \tilde{N}_4 \end{bmatrix} \quad (14)$$

$$= \tilde{\Lambda} X' + \tilde{N}$$

$$\Theta = (|\Lambda_1|^2 + |\Lambda_2|^2 + |\Lambda_3|^2 + |\Lambda_4|^2)$$

$$\Phi = (\Lambda_1 \Lambda_4^* + \Lambda_1^* \Lambda_4 - \Lambda_2 \Lambda_3^* - \Lambda_2^* \Lambda_3)$$

$$\tilde{N}_1 = \Lambda_1^* N_1 + \Lambda_2 N_2^* + \Lambda_3 N_3^* + \Lambda_4^* N_4$$

$$\tilde{N}_2 = \Lambda_2^* N_1 - \Lambda_1 N_2^* + \Lambda_4 N_3^* - \Lambda_3^* N_4$$

$$\tilde{N}_3 = \Lambda_3^* N_1 + \Lambda_4 N_2^* - \Lambda_1 N_3^* - \Lambda_2^* N_4$$

$$\tilde{N}_4 = \Lambda_4^* N_1 - \Lambda_3 N_2^* - \Lambda_2 N_3^* + \Lambda_1^* N_4$$

Equation (14) is a result obtained by changing a matrix form through Maximal Ratio Combining (MRC). The MRC method combines signals according to ratio based on the best performance.

The simultaneous equation solver 619 solves simultaneous equations using the output signal of the linear combiner 617. Elements of Equation (14) are multiplied by $\Phi$ because of a 4×4 matrix that does not have the full rank.

Thus, components other than original signals are to be removed. For this, the simultaneous equations are solved. The simultaneous equation solver 619 computes output noise power of a linearly combined signal. The output noise power is shown in Equation (15).

$$\sigma_{n,eq}^2 \triangleq E\{(\Theta\Lambda_1^* - \Phi\Lambda_4^*)N_1 \cdot (\Theta\Lambda_1 - \Phi\Lambda_4)N_1^*\} + \qquad (15)$$
$$E\{(\Theta\Lambda_2 + \Phi\Lambda_3)N_2^* \cdot (\Theta\Lambda_2^* + \Phi\Lambda_3^*)N_2\} +$$
$$E\{(\Theta\Lambda_3 + \Phi\Lambda_2)N_3^* \cdot (\Theta\Lambda_3^* + \Phi\Lambda_2^*)N_3\} +$$
$$E\{(\Theta\Lambda_4^* - \Phi\Lambda_1^*)N_4 \cdot (\Theta\Lambda_4 - \Phi\Lambda_1)N_4^*\}$$

$$= (\Theta^2|\Lambda_1|^2 + \Phi^2|\Lambda_4|^2 - \Theta\Phi\Lambda_1^*\Lambda_4 - \Theta\Phi\Lambda_1\Lambda_4^*)N_0 +$$

$$(\Theta^2|\Lambda_2|^2 + \Phi^2|\Lambda_3|^2 + \Theta\Phi\Lambda_2^*\Lambda_3 + \Theta\Phi\Lambda_2\Lambda_3^*)N_0 +$$

$$(\Theta^2|\Lambda_3|^2 + \Phi^2|\Lambda_2|^2 + \Theta\Phi\Lambda_2^*\Lambda_3 - \Theta\Phi\Lambda_2\Lambda_2^*)N_0 +$$

$$(\Theta^2|\Lambda_4|^2 + \Phi^2|\Lambda_1|^2 - \Theta\Phi\Lambda_1^*\Lambda_4 - \Theta\Phi\Lambda_1\Lambda_4^*)N_0$$

$$= [(\Theta^2 + \Phi^2)\Theta + \Theta\Phi(-\Phi) + \Theta\Phi(-\Phi)]N_0$$

$$= (\Theta^2 - \Phi^2) \cdot \Theta \cdot N_0$$

Upon receiving a signal obtained by solving the simultaneous equations, the SC MMSE-FDE processor 621 performs a frequency domain equalization process. The SC MMSE-FDE processor 621 applies an MMSE technique to the output signal of the simultaneous equation solver 619. At this time, a resulting signal is shown in Equation (16).

$$Y = \begin{bmatrix} \Theta\tilde{X}_1 - \Phi\tilde{X}_4 \\ \Theta\tilde{X}_2 + \Phi\tilde{X}_3 \\ \Theta\tilde{X}_3 + \Phi\tilde{X}_2 \\ \Theta\tilde{X}_4 - \Phi\tilde{X}_1 \end{bmatrix} \qquad (16)$$

$$= \begin{bmatrix} \Theta^2 - \Phi^2 & 0 & 0 & 0 \\ 0 & \Theta^2 - \Phi^2 & 0 & 0 \\ 0 & 0 & \Theta^2 - \Phi^2 & 0 \\ 0 & 0 & 0 & \Theta^2 - \Phi^2 \end{bmatrix} X' + \check{N}$$

$$= \Gamma X' + \check{N},$$

$$Q \triangleq \frac{\Gamma^*}{\Gamma^2 + \frac{\sigma_{n,eq}^2}{\sigma_x^2}I_\Lambda} = \frac{1}{\Gamma + \frac{\Theta N_0}{\sigma_s^2}I_4},$$

$$\therefore \hat{X} = QY = \left(\Gamma + \frac{\Theta N_0}{\sigma_s^2}I_4\right)^{-1} Y$$

The simultaneous equation solver 619 computes a mean value of output signals of the linear combiner 617. The mean value is computed using Equation (17).

$$BA_1+CA_4=X_1(B^2-C^2)+N_1(B\Lambda_1^{'}-C\Lambda_4^{'})+N_2(B\Lambda_2+$$
$$C\Lambda_3)+N_3(B\Lambda_3+C\Lambda_2)+N_4(B\Lambda_4^{'}-C\Lambda_1^{'})$$

$$BA_2+CA_3=X_2(B^2-C^2)+N_1(B\Lambda_2^{'}+C\Lambda_3^{'})+N_2(-B\Lambda_1+$$
$$C\Lambda_4)+N_3(B\Lambda_4-C\Lambda_1)-N_4(B\Lambda_4^{'}+C\Lambda_2^{'})$$

$$BA_3+CA_2=X_3(B^2-C^2)+N_1(C\Lambda_2^{'}+B\Lambda_3^{'})+N_2(-C\Lambda_1+$$
$$B\Lambda_4)+N_3(C\Lambda_4-B\Lambda_1)-N_4(B\Lambda_4^{'}+C\Lambda_2^{'})$$

$$BA_4+CA_1=X_4(B^2-C^2)+N_1(C\Lambda_1^{'}-B\Lambda_4^{'})+N_2(C\Lambda_2+$$
$$B\Lambda_3)+N_3(C\Lambda_3+B\Lambda_2)+N_4(B\Lambda_4^{'}-B\Lambda_1^{'}) \qquad (17)$$

The SC MMSE-FDE processor 621 performs a frequency domain equalization process using the mean value of the simultaneous equation solver 619. The SC MMSE-FDE processor 621 computes an MMSE and performs a signal combination and signal detection. Because a signal is detected using the MMSE, a total estimation error is minimized. Thus, the signal detection is effectively performed for a fading channel with a null.

A signal output through the combination of the SC MMSE-FDE processor 621 is shown in Equation (18).

$$Y = \begin{bmatrix} \Theta\tilde{X}_1 - \Phi\tilde{X}_4 \\ \Theta\tilde{X}_2 + \Phi\tilde{X}_3 \\ \Theta\tilde{X}_3 + \Phi\tilde{X}_2 \\ \Theta\tilde{X}_4 - \Phi\tilde{X}_1 \end{bmatrix} \qquad (18)$$

$$= \begin{bmatrix} \Theta^2 - \Phi^2 & 0 & 0 & 0 \\ 0 & \Theta^2 - \Phi^2 & 0 & 0 \\ 0 & 0 & \Theta^2 - \Phi^2 & 0 \\ 0 & 0 & 0 & \Theta^2 - \Phi^2 \end{bmatrix} X' + \check{N}$$

$$= \Gamma X' + \check{N},$$

$$Q \triangleq \frac{\Gamma^*}{\Gamma^2 + \frac{\sigma_{n,eq}^2}{\sigma_x^2}I_\Lambda} = \frac{1}{\Gamma + \frac{\Theta N_0}{\sigma_s^2}I_4},$$

$$\therefore \hat{X} = QY = \left(\Gamma + \frac{\Theta N_0}{\sigma_s^2}I_4\right)^{-1} Y$$

$$\hat{X} = [\hat{X}_1 \hat{X}_2 \hat{X}_3 \hat{X}_4]^T;$$

$$\hat{X}_1 = \hat{X}_{ref1}^e,$$

$$\hat{X}_2 = \hat{X}_{ref2}^e,$$

$$\hat{X}_3 = \hat{X}_{ref1}^o,$$

$$\hat{X}_4 = \hat{X}_{ref2}^o$$

$\check{N}$ corresponding to noise can be expressed by $[\hat{N}_1 \hat{N}_2 \hat{N}_3 \hat{N}_4]^T$. $\sigma_x^2$ denotes the desired signal power. Using Equation (17), the signal detector detects signals and inputs the detected signals to the DEMUXs 623 and 625. The DEMUXs 623 and 625 demultiplex the detected signals. The detected signals are $\hat{X}_{ref\,1}$ and $\hat{X}_{ref\,2}$. The DEMUX 623 receives $\hat{X}_{ref\,1}$ and the DEMUX 625 receives $\hat{X}_{ref\,2}$. The demultiplexed detected signals are output to the FFT processors 627, 629, 631, and 632. At this time, the DEMUX 623 outputs signals of $\hat{X}_{ref\,1}^{e}$ and $\hat{X}_{ref\,2}^{e}$ and the DEMUX 625 outputs signals of $\hat{X}_{ref\,1}^{o}$ and $\hat{X}_{ref\,2}^{o}$. The output signals are input to the FFT processors 627, 629, 631, and 633. The FFT processors 627, 629, 631, and 633 perform N/2-point FFT processes. At this time, the FFT processors 627, 629, 631, and 633 receive the $\hat{X}_{ref\,1}^{e}$, $\hat{X}_{ref\,2}^{e}$, $\hat{X}_{ref\,1}^{o}$, and $\hat{X}_{ref\,2}^{o}$ signals, respectively, and perform the FFT processes for the received signals. The FFT signals are output to the MUX 635. The MUX 635 multiplexes the received FFT signals.

Next, the proposed STFBC scheme will be described with reference to FIG. 7, where the graph was obtained by measuring Bit Error Rates (BERs) in three 4×1 antenna systems based on the STBC, SFBC, and STFBC schemes. In relation to the graph shown in FIG. 7, a block with a size of 256 symbols and a Quadrature Phase Shift Keying (QPSK) modulation scheme were used. Furthermore, a single carrier, a center frequency band of 2 GHz, and a bandwidth of 5 MHz were used.

Figure 7:
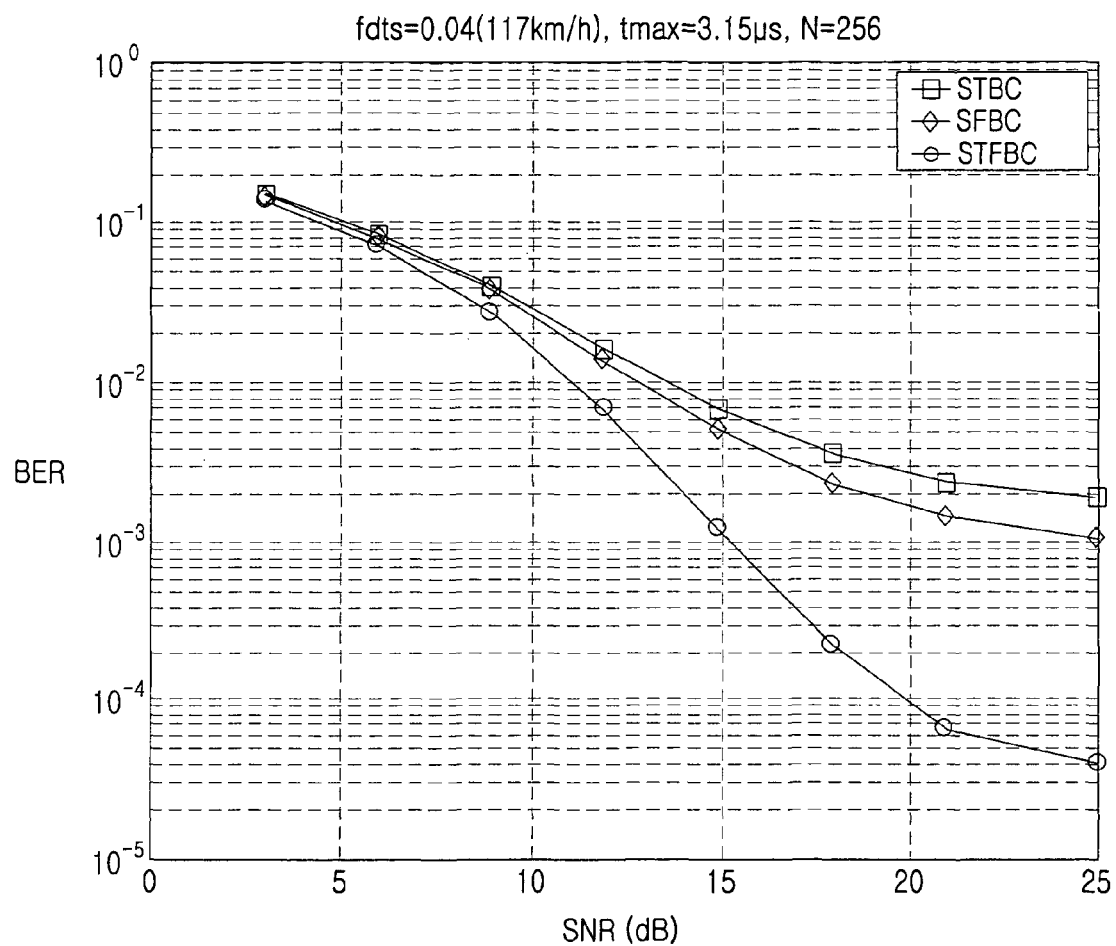
FIG. 7 is a graph illustrating a performance curve of the communication system using the STFBC scheme in accordance with the present invention.

From FIG. 7, it can be seen that the system based on the STFBC scheme outperforms the STBC system and the SFBC system.

As described above, the present invention employs the STFBC scheme in which both STBC and SFBC schemes are applied, thereby avoiding system performance degradation in a fast fading channel and a frequency selective fading channel of a communication system using the existing STBC and SFBC schemes.

Although preferred embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for transmitting a signal in a wireless communication system comprising a transmitter with at least four transmit antennas and a receiver with at least one receive antenna, the method comprising:
   a) performing Space Frequency Block Coding (SFBC) processes for blocks to be transmitted through each of two antenna pairs and outputting signal blocks on which SFBC has been performed whose number corresponds to the number of transmit antennas; and
   b) performing a Space Time Block Coding (STBC) process for the signal blocks generated according to the antenna pairs, consecutively, and transmitting signals carried by single carriers through the at least four transmit antennas mapped to the signal blocks,
   wherein step a) comprises:
   performing an SFBC process for signals to be transmitted through first and third antennas and outputting first signal blocks mapped to the first and third antennas; and
   performing an SFBC process for signals to be transmitted through second and fourth antennas and outputting second signal blocks mapped to the second and fourth antennas.

2. The method of claim 1, wherein the signals obtained by performing the STBC process for the first and second signal blocks are transmitted through the at least four transmit antennas.

3. The method of claim 1, wherein guard intervals are inserted between the blocks for which the STBC process has been performed.

4. An apparatus for transmitting a signal in a wireless communication system comprising a transmitter with at least four transmit antennas and a receiver with at least one receive antenna, the apparatus comprising:
   a symbol mapper for mapping an input bit stream to a symbol of a predetermined length;
   a Space Time Frequency Block Code (STFBC) encoder for performing Space Frequency Block Coding (SFBC) processes for blocks to be transmitted through each of two antenna pairs, outputting signal blocks on which SFBC has been performed whose number corresponds to the number of transmit antennas, and performing a Space Time Block Coding (STBC) process for the signal blocks generated according to the antenna pairs, consecutively; and
   guard interval inserters for inserting guard intervals into output signals of the STFBC encoder and transmitting the signals into which the guard intervals have been inserted through the at least four transmit antennas,
   wherein the STFBC encoder comprises:
   a first SFBC encoder for performing an SFBC process for signals to be transmitted through first and third antennas and outputting first signal blocks mapped to the first and third antennas; and
   a second SFBC encoder for performing an SFBC process for signals to be transmitted through second and fourth antennas and outputting second signal blocks mapped to the second and fourth antennas.

5. The apparatus of claim 4, further comprising: an STBC encoder for performing the STBC process for the first and second signal blocks.

* * * * *